United States Patent Office 3,630,901
Patented Dec. 28, 1971

3,630,901
GREASE COMPOSITIONS
Joseph F. Messina, Delaware, and Henry Gisser, Philadelphia, Pa., assignors to the United States of America as represented by the Secretary of the Army
No Drawing. Filed Sept. 24, 1969, Ser. No. 860,797
Int. Cl. C10m 5/18, 5/20
U.S. Cl. 252—51    8 Claims

ABSTRACT OF THE DISCLOSURE

Stable grease compositions having excellent extreme pressure properties, among others, the greases consisting of about 66.5 to 75.8 weight percent petroleum fluids having pour points ranging between —7.0 to —40.0° C., 0.5 weight percent phenyl-1-naphthylamine, the balance being tetrafluoroethylene polymer having a molecular weight of 10,000–50,000, a softening point of 321.1° C., a particle size less than 30 microns in diameter, and supplied as a 7.5% suspension in trichlorotrifluoroethane.

---

The invention described herein may be manufactured, used and licensed by or for the Government for governmental purposes without the payment to use of any royalty thereon.

This invention relates to improved lubricants and more particularly concerns grease compositions which are chemically and physically stable over wide temperature ranges for extended periods.

It is an object of the invention to provide improved grease compositions having excellent extreme pressure properties.

Another object of the invention is to provide grease compositions which exhibit good shear stability, low fluid separation, high dropping point, good oxidation stability and anti-wear and extreme pressure properties.

Other objects and features of the invention will become apparent as the invention is more fully hereinafter disclosed.

Briefly, we have discovered new grease compositions especially useful to the military wherein selected petroleum fluids are thickened with a fluoro polymer.

More specifically, we have discovered that naphthenic and paraffinic base fluids, to which 0.5% by weight of phenyl - 1 - naphthylamine, an oxidation inhibitor, was added, and deep dewaxed mineral oil may be thickened with tetrafluoroethylene polymer (hereinafter referred to as PTFE) having a molecular weight of about 10,000–50,000 to produce a stable, grease-type lubricant for military applications, among others.

Typical properties of the PTFE solids used in the preparation of our inventive compositions are:

A softening point of 321.1° C.

A particle size under 30 microns in diameter, the PTFE solids being supplied as a 7.5% suspension in trichlorotrifluoroethane.

The viscosities of the base fluids, determined at 37.78° C. are as follows:

TABLE I

Viscosity of base fluids at 37.78° C.

Petroleum base fluid:                      Viscosity, centistokes
  Naphthenic mineral oil _____ 23
  Paraffinic mineral oil _____ 23
  Deep dewaxed naphthenic mineral oil _____ 79

The greases were prepared as follows:

The dispersion of PTFE in trichlorotrifluoroethane was heated on a steam bath until 50–75% of the solvent evaporated. Approximately 75% of the required quantity of the desired petroleum fluid was then added, the mixture was stirred and heating continued until all the trichlorotrifluoroethane had evaporated. The trichlorotrifluoroethane was analyzed by gas chromatography using the following technique. A sample of the grease mixture was eluted using C.P. benzene. The eluted fluid mixture was placed in a gas chromatograph with a 20 foot Carbowax 20 M column at 50 C. and a helium gas flow of 10 ml. per minute. Absence of a retention peak after 3.3 minutes indicated that all of the trichlorotrifluoro had evaporated. The remainder of the petroleum fluid was then added while stirring, and stirring continued until a homogeneous grease-like product was obtained. The mixture was cooled to room temperature and passed through a colloid mill with the stator-to-rotor clearance set at 0.001 in. The homogenized mixture was then placed in a freezer at minus 10° C. for 24 hours, removed and permitted to remain at room temperature an additional 24 hours prior to use. At least 2 batches of each grease were prepared. Te tickener content was determined in duplicate on each batch using a Soxhlet extractor and benzene. The data are presented in Table II below:

TABLE II.—GREASE COMPOSITIONS

| Name | Petroleum base fluid Wt., percent | Pour point, ° C. | PTFE thickener, wt. percent |
|---|---|---|---|
| Naphthenic mineral oil | 71.4 | −37.0 | 28.1 |
| Paraffinic mineral oil | 73.4 | −7.0 | 26.1 |
| Deep dewaxed naphthenic mineral oil | 75.8 | −40.0 | 24.2 |

The naphthenic and paraffinic mineral oils have 0.5 weight percent phenyl-1-naphthylamine added thereto for oxidation inhibition. The pour points presented above however are for the petroleum fluids without additives.

The PTFE thickener content above represents a minimum concentration necessary to provide a stable grease-like structure. If less than the amount above is used, a semifluid consistency usually results. The effective range of base fluids is presented in Table III below:

TABLE III

Petroleum base fluid effective ranges

Base fluid:                                     Effective range, wt. percent
  Naphthenic mineral oil _____ 66.5–71.4
  Paraffinic mineral oil _____ 68.7–73.4
  Deep dewaxed naphthenic mineral oil ____ 70.7–75.8

Shear stability tests were conducted using the one-quarter scale (ASTM D 1403–62) grease worker modified to permit automatic operation. In Table IV below, the values representing double strokes, the maximum change in consistency for any of the petroleum fluids listed below is only 41 units (one unit=one-tenth of a millimeter). After six month's storage, the change in worked consistency on the stored samples was not significantly different than the change in the unstored samples. The table indicates that the mineral oil PTFE thickened greases were shear stable, and that this property would not change significantly with passage of time. All values presented in Tables IV thru VII were obtained on grease compositions having the specific proportions as stated in table above, the naphthenic and paraffinic mineral oils containing 0.5% by weight phenyl-1-naphthylamine.

TABLE IV.—SHEAR STABILITY

| Grease | Strokes [1] 0 | 500 | 10,000 | 100,000 |
|---|---|---|---|---|
| Naphthenic | 320 (309) | 321 (323) | 335 (339) | 361 (381) |
| Paraffinic | 335 (324) | 327 (343) | 350 (365) | 353 (402) |
| Deep dewaxed mineral oil | 329 (329) | 336 (333) | 326 (347) | 339 (363) |

[1] Unworked, no strokes.

NOTE.—Data in parentheses are values obtained after 6 months storage.

In comparison therewith, prototype grease composition used currently by all military services of the United States Government, other than for chassis lubrication, is a diester mixture base grease including additives and lithium hydroxystearate, MIL–G–23827A, Aug. 1, 1965, and yielded 270 units at 0 strokes and 375 units at 100,000 strokes, a difference of 105, or considerably poorer than our grease compositions.

Fluid separation was low. Laboratory values in Table V below were corroborated by visual observations on test samples stored in the laboratory from six to twelve months.

TABLE V.—FLUID SEPARATION AND DROPPING POINT

| Grease | Bleeding, wt. percent[1] | Dropping point, °C.[2] |
|---|---|---|
| Naphthenic | 2.5 | 290.5 |
| Paraffinic | 4.2 | 300.0 |
| Deep dewaxed mineral oil | 4.3 | 304.5 |

[1] Fed. Std. Test Method 321.2 (Fed. Std. Test Method 791b, 1963), 100° C. for 30 hours.
[2] ASTM D 2265–67.

Our greases exhibited high dropping points (temperature at which the first drop of material falls from the cup), a property useful for high temperature applications.

In comparison therewith, prototype grease composition used currently by all military services of the United States Government, other than for chassis lubrication, is a diester mixture base grease including additives and lithium hydroxystearate, MIL–G–23827A, Aug. 1, 1965, yielded 5.0 weight percent bleeding and a dropping point of about 163° C., considerably inferior to our grease compositions.

Antiwear properties were determined in accordance with ASTM D 2266–64T, modified as described below, using the Four-Ball Wear Tester at a 10 kg. load. The test temperature was 75° C. and the speed of rotation of the upper ball was 600 revolutions per minute, rather than 1200 as specified in the above ASTM procedure, for 1 hour. Data are presented in Table VI below:

TABLE VI

Antiwear properties

| Grease: | Wear scar diameter at 10 kg. |
|---|---|
| Naphthenic | mm 0.416 |
| Paraffinic | 0.434 |
| Deep dewaxed mineral oil | 0.305 |
| MIL–G–23827A | 0.397 |

Of the three inventive grease compositions, all of which are considered satisfactory, only the deep dewaxed mineral oil yielded a smaller wear scar diameter than the currently used MIL–G–23827A grease composition.

The Four-Ball EP Tester determines loads at incipient seizure and at weld. Incipient seizure is defined as the load at which a sudden sizeable increase in wear scar diameter occurs, and weld is the load at which motion of the upper rotating ball in relation to the other three is no longer possible. The data in Table VII below show our inventive grease compositions to be superior to MIL–G–23827A grease, hereinabove referred to:

TABLE VII.—EXTREME PRESSURE PROPERTIES

| Grease | Seizure load, kg. | Weld load, kg. |
|---|---|---|
| Naphthenic | 100 | 230 |
| Paraffinic | 100 | 270 |
| Deep dewaxed mineral oil | 110 | 250 |
| 23827A | 90 | 190 |

It must be remembered that no extreme pressure additives are used in our grease compositions above, whereas MIL–G–23827A grease requires the presence of such an additive.

We wish it to be understood that we do not desire to be limited to the exact details described, for obvious modifications will occur to a person skilled in the art.

We claim:

1. A homogeneous grease composition comprising about 66.5 to 75.8 weight percent petroleum base fluid, .5 weight percent phenyl-1-naphthylamine, and the balance tetrafluoroethylene polymer.

2. The composition of claim 1 wherein said petroleum base fluid is selected from the group consisting of naphthenic mineral oil, paraffinic mineral oil, and deep dewaxed mineral oil.

3. The composition of claim 1 wherein said polymer has a molecular weight between about 10,000 to 50,000, and a particle size less than about 30 microns in diameter.

4. The composition of claim 2 wherein said naphthenic mineral oil has a pour point of less than 37.0° C., said paraffinic mineral oil has a pour point of less than 7.0° C., and said deep dewaxed mineral oil has a pour point of less than 40.0° C.

5. The composition of claim 2 wherein said naphthenic mineral oil comprises about 66.5 to 71.4 weight percent of said grease composition, wherein said phenyl-1-naphthylamine comprises .5 weight percent of said grease composition, and the balance being substantially tetrafluoroethylene polymer having a molecular weight between about 10,000 to 50,000 and a particle size less than about 30 microns in diameter.

6. The composition of claim 2 wherein said paraffinic mineral oil comprises about 68.7 to 73.4 weight percent of said grease composition, wherein said phenyl-1-naphthylamine comprises .5 weight percent of said grease composition, and the balance being substantially tetrafluoroethylene polymer having a molecular weight between about 10,000 to 50,000, and a particle size less than about 30 microns in diameter.

7. The composition of claim 2 wherein said deep dewaxed mineral oil comprises about 70.7 to 75.8 weight percent of said grease composition, wherein said phenyl-1-naphthylamine comprises .5 weight percent of said grease composition, and the balance being substantially tetrafluoroethylene polymer having a molecular weight between about 10,000 to 50,000, and a particle size less than about 30 microns in diameter.

8. A homogeneous grease composition exhibiting improved antiwear and extreme pressure properties, shear and oxidation stability, a low bleeding point and a high dropping point, said grease comprising a major proportion of petroleum base fluid having a pour point less than about 7° C., .5 weight percent phenyl-1-naphthylamine, and tetrafluoroethylene polymer having a molecular weight ranging between about 10,000 to 50,000 and a particle size of less than 30 microns in diameter, said petroleum base fluid being selected from the group consisting of about 66.5 to 71.4 weight percent naphthenic mineral oil, 68.7 to 73.4 weight percent paraffinic mineral oil, and 70.7 to 75.8 weight percent deep dewaxed mineral oil.

References Cited

UNITED STATES PATENTS

| 3,258,425 | 6/1966 | Burke | 252—58 |
| 3,262,879 | 7/1966 | Messina | 252—58 |
| 3,453,210 | 7/1969 | Wright | 252—58 |

DANIEL E. WYMAN, Primary Examiner

I. VAUGHN, Assistant Examiner

U.S. Cl. X.R.

252—58